C. E. STONE.
CHECK.
APPLICATION FILED SEPT. 28, 1915.
1,331,947.
Patented Feb. 24, 1920.
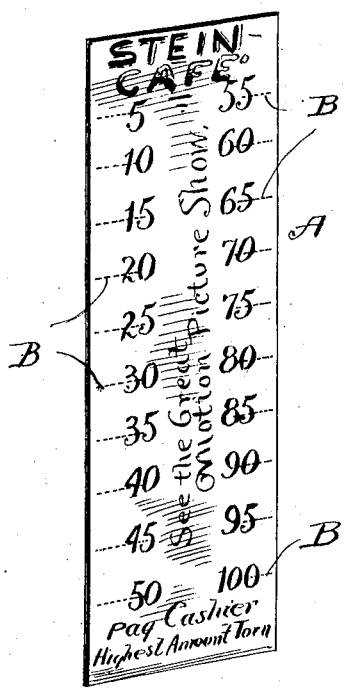

UNITED STATES PATENT OFFICE.

CHARLES E. STONE, OF BOSTON, MASSACHUSETTS.

CHECK.

1,331,947. Specification of Letters Patent. Patented Feb. 24, 1920.

Application filed September 28, 1915. Serial No. 53,059.

*To all whom it may concern:*

Be it known that I, CHARLES E. STONE, a citizen of the United States, residing at Boston, in the county of Suffolk and State of Massachusetts, have invented certain new and useful Improvements in Checks, and I hereby declare that the following is a full, clear, and exact description of the same, reference being had to the annexed drawings, making a part of this specification, and to the letters and figures of reference marked thereon.

The object of my invention is to provide a check for use in restaurants, cafés, or for any other purpose where the same may be useful, which will avoid the necessity of using a punch, or any other instrument for indicating the value, or amount intended to be represented by the check, and to this end my invention consists in the device having the characteristics substantially hereinafter specified and claimed.

In the accompanying drawings:

The figure is a view in perspective of a check suitable for restaurant, or café use, embodying my invention.

In the embodiment of my invention shown in the drawings, the check A is of the usual, convenient form of a strip of heavy paper, and upon it in two columns there are numerals beginning with "5" and ending with "100" denoting money from five cents to one dollar, and, in line with and extending over each numeral, are lines of perforations B which run from the adjacent edge of the check inward and constitute in each case a line of weakness, as well as a means of indication for a tear to be made from the adjacent edge of the check to the numeral. Upon the check, in some convenient place, is printed the words "Pay cashier highest amount torn." It will thus be seen that to register upon the check the highest amount to be paid, or desired to be indicated, it is necessary merely to make a tear with the fingers along the line of weakness from the edge of the check to the desired numeral. Thus, even though a customer in a café might first make purchases amounting to twenty cents, and the waiter tear the check to denote that, but later the customer increases his orders so that the proper charge is, say, fifty cents, the waiter would then make the tear at the numeral "50," and, notwithstanding, the tear previously made the amount really required to be paid could at once be determined.

Preferably the lines of weakness B stop just short of the edge of the check in order to avert the danger of accidental tearing, but I do not limit myself to any particular arrangement in this regard and, of course, I do not limit myself to any particular number of columns of figures, or arrangement of the columns of figures.

Upon those portions of the check not containing the numerals, any desired advertising matter may be printed. For the sake of the advertisment, it will be seen that the advertiser might find it profitable to print the checks and give them to the restaurants, cafés, etc., using them.

The advantage of getting rid of the use of punches or other tools, such as saving the first cost thereof, the inconvenience and annoyance involved in their use, etc., will be evident.

Having thus described my invention what I claim is—

A check having means to indicate an amount to be paid comprising a progressive series of numerals arranged in a column contiguous to the side of the check, the check being of tearable material and having a line of weakness extending from each numeral toward the edge of the check, substantially at right angles to the latter along which the check is tearable without removal of any substantial portion of the check material.

In testimony whereof I affix my signature in presence of two witnesses.

CHARLES E. STONE.

Witnesses:
GEORGIA E. MANN,
IDA S. MANN.